J. A. HALL.
Seeder and Cultivator.
No. 98,956.  Patented Jan. 18, 1870.
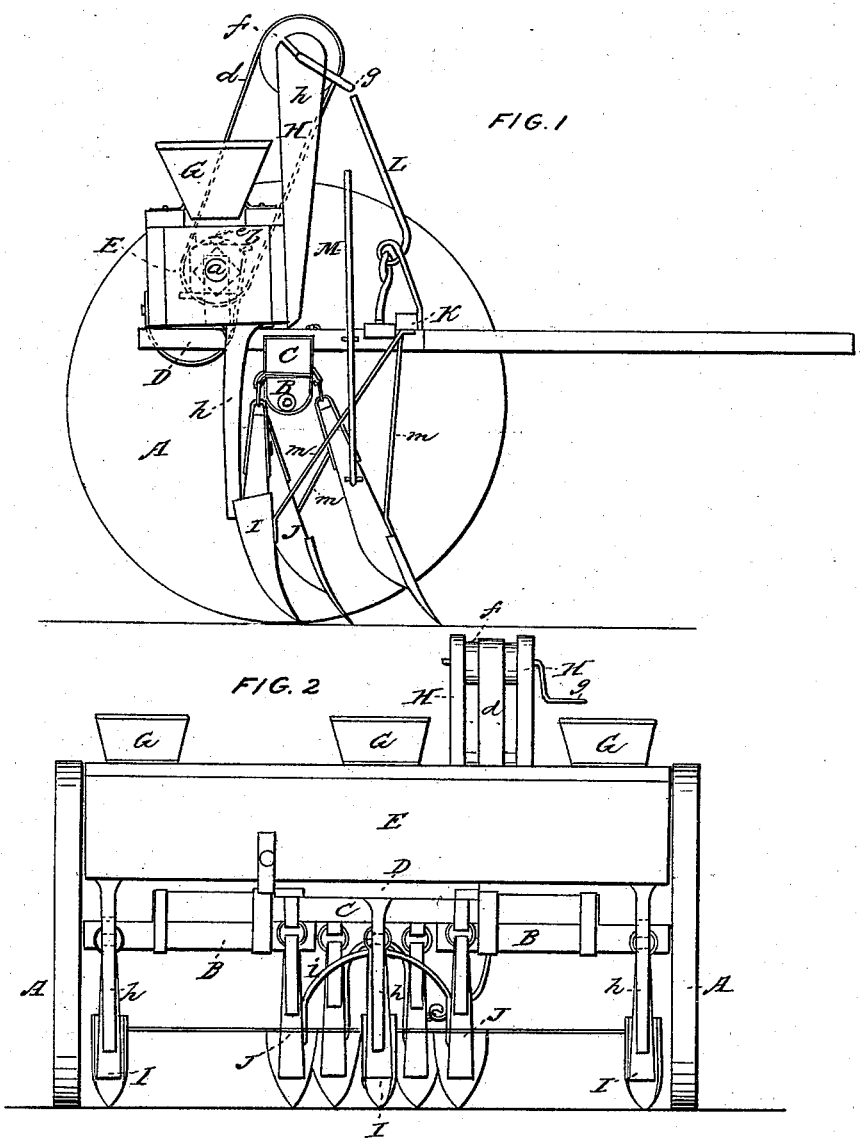

United States Patent Office.

J. A. HALL, OF RALEIGH, INDIANA.

Letters Patent No. 98,956, dated January 18, 1870.

IMPROVED COMBINED SEEDER AND CULTIVATOR.

The Schedule referred to in these Letters Patent and making part of the same.

To all whom it may concern:

Be it known that I, J. A. HALL, of Raleigh, in the county of Rush, and State of Indiana, have invented certain new and useful Improvements in Combined Seeder and Cultivator; and I do hereby declare that the following is a full, clear, and exact description thereof, reference being had to the accompanying drawings, and to the letters of reference marked thereon, which form a part of this specification.

The nature of my invention consists in the construction and general arrangement of a "combined planter and cultivator," as will be hereinafter fully set forth.

In order to enable others skilled in the art to which my invention appertains, to make and use the same, I will now proceed to describe its construction and operation, referring to the annexed drawings, in which—

Figure 1 is a longitudinal vertical section, and

Figure 2, a rear elevation of my machine.

A A represent the wheels, mounted upon the outer ends of the axle-tree B, which is made in sections, and extended, leaving a space between the inner end of the two sections, which are secured to a beam, C, placed on their upper side.

Upon the upper side of the beam C, is secured a frame, D, which, in rear of said beam, supports a box, E, having three hoppers and grain-boxes G G, formed in it, one at the centre and one at each end.

Through the entire length of the box E, runs a shaft, $a$, which, under each of the hoppers G, is provided with wings or flanges $b$, to carry the corn down as the shaft revolves. A brush or scraper, attached within the box, prevents more than the desired quantity from passing at each revolution of the shaft $a$.

The shaft is revolved by means of a belt, $d$, communicating motion to a pulley, $e$, upon the shaft, from a roller, $f$, turned by a crank, $g$, said roller $f$ being pivoted between standards H H, upon the frame D.

At each end of the axle B, and in the centre of the beam C, is hinged a furrow-plow, I, said plows being directly under and forward of the hoppers G G, and the corn is conducted, through tubes $h$ $h$, into the ground directly in rear of said plows I I.

At each inner end of the axle B, is hinged a cultivator-plow, J, and on the front side of the beam C, are hinged two other similar plows, each pair of said plows being connected by a bent rod, $i$.

All the furrow-plows I I, and one of each pair of cultivator-plows J, are connected, by chains $m$ $m$, to a bar, K, hinged upon the front end of the frame D, and turned by a lever, L, so as to raise the plows out of the ground when desired.

To the side of the frame D, is pivoted another lever, M, which is connected with the front pair of cultivator-plows, so that they may be raised independent of the other, when so desired.

Having thus fully described my invention,

What I claim as new, and desire to secure by Letters Patent, is—

1. The arrangement of the shaft $a$, wings or flanges $b$ $b$, pulley $e$, belt $d$, roller $f$, and crank $g$, substantially as shown and described.

2. The combination of the furrow-plows I I, cultivator-plows J J, bar K, lever L, and the dropping-mechanism herein described, all substantially as specified.

In testimony that I claim the foregoing as my own, I affix my signature, in presence of two witnesses.

J. A. HALL.

Witnesses:
 WILSON T. JACKSON,
 SIDNEY LA RUE.